No. 858,915. PATENTED JULY 2, 1907.
T. W. SHEPPARD.
CLUTCH.
APPLICATION FILED OCT. 29, 1906.

WITNESSES

INVENTOR
Thomas W. Sheppard
BY
ATTORNEYS

UNITED STATES PATENT OFFICE.

THOMAS W. SHEPPARD, OF NEW YORK, N. Y.

CLUTCH.

No. 858,915.        Specification of Letters Patent.        Patented July 2, 1907.

Application filed October 29, 1906. Serial No. 341,013.

*To all whom it may concern:*

Be it known that I, THOMAS W. SHEPPARD, a subject of the King of Great Britain, and a resident of the city of New York, borough of Manhattan, in the county and State of New York, have invented a new and Improved Clutch, of which the following is a full, clear, and exact description.

This invention relates to clutches, and especially to the class of clutches which are employed for transmitting power intermittently and in varying amounts. For this reason the clutch is especially adapted for use in connection with automobiles, motor boats and in similar situations where the engine or prime mover must be started up from time to time. In some cases even when the engine is running at full speed on the governor, the application of the clutch may reduce the speed of the engine so far that it will stop.

The object of the invention is to produce a clutch which is especially adapted to be used in connection with an engine, or prime mover which is started up from time to time, and which can be nicely controlled so that the transmitting power of the clutch can be brought gradually from a minimum to a maximum, the minimum being sufficiently low to prevent the stoppage or material retarding of the engine, while the maximum is sufficient to substantially transmit all the power which the engine can develop when running on the governor.

The invention consists in the construction and combination of parts to be more fully described hereinafter and particularly set forth in the claims.

Reference is to be had to the accompanying drawings forming a part of this specification, in which similar characters of reference indicate corresponding parts in both figures.

Figure 1:
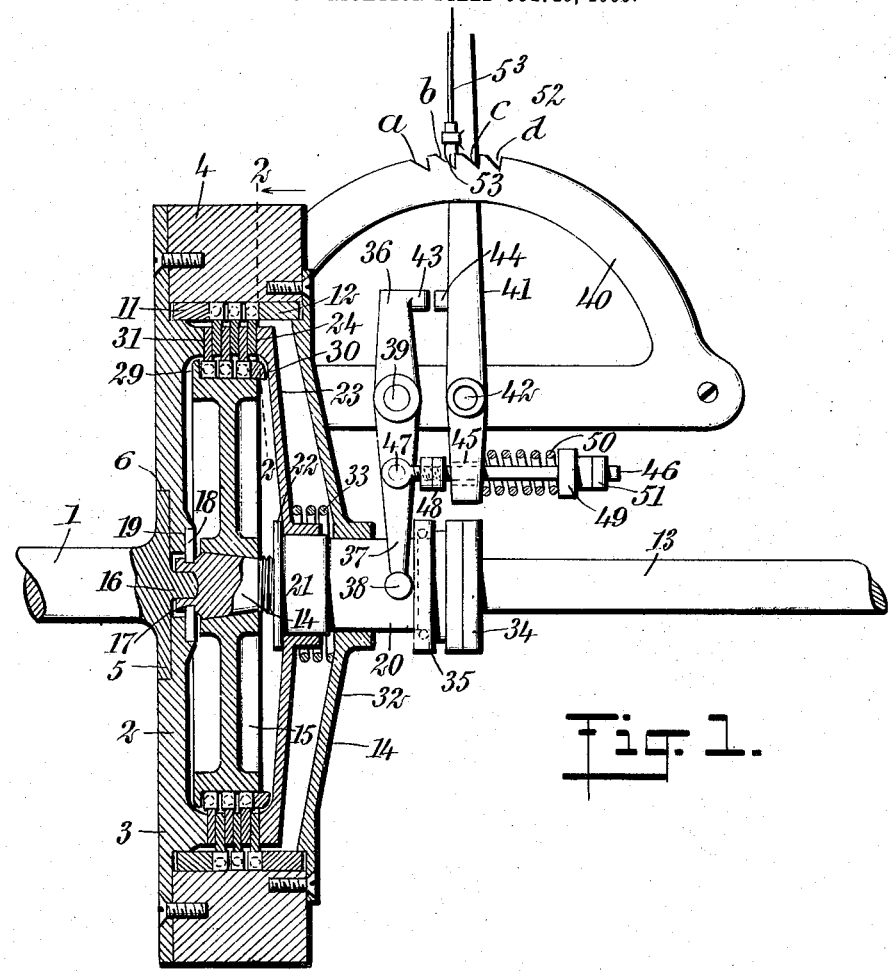
Figure 2:
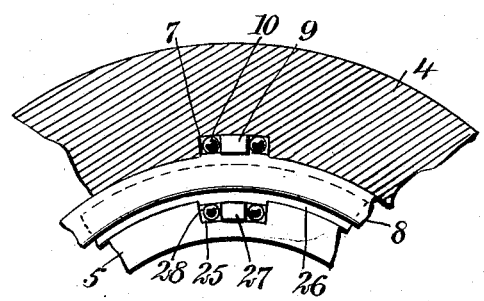

Figure 1 is a longitudinal central section through a clutch constructed according to my invention; and Fig. 2 is a detail cross section taken on the line 2—2 of Fig. 1 and illustrating the construction of the clutch more completely.

Referring more particularly to the parts, 1 represents the driving shaft, which may be that of an engine or other prime mover. Upon the end of this shaft a wheel 2 is rigidly attached, the said wheel consisting of a disk 3 having a heavy rim 4 rigidly attached thereto, as shown. This wheel constitutes the fly-wheel or balance-wheel for the engine. At the point of attachment between the disk 3 and the shaft 1, the shaft 1 is preferably formed with an enlarged head 5 which seats in a recess 6 formed in the face of the disk as shown. Upon its inner side the rim 4 is provided with longitudinally disposed grooves or slots 7, which are of substantially rectangular form, as indicated in Fig. 2.

I provide a plurality of friction rings 8, which I shall call outer rings. These rings are provided at suitable points on their peripheries, with ears 9 which are received in the grooves 7 in the manner indicated most clearly in Fig. 2. The grooves 7 are of considerably greater width than the ears 9, so that ball chambers are provided which are adapted to receive balls 10 in the manner indicated. In the inner ends of the grooves 7, blocks 11 are respectively received, which prevent the balls from falling out of position, and similar blocks 12 are placed at the outer ends of the grooves slots 7 to prevent the balls from becoming dislocated in that direction.

The driven shaft 13 is in alinement with the shaft 1 and is formed at its extremity adjacent to the shaft 1 with a conical neck 14 upon which an inner wheel 15 is tightly seated by hydraulic pressure or similar means. Beyond this neck 14 the shaft 13 is formed with a central opening or recess which receives a stud 16 formed integrally in the adjacent face of the shaft 1. On the end of the shaft 13 beyond the neck 14 a circumferential groove 17 is formed, which is adapted to receive a split collar 18, which collar seats against the inner face of the disk 3 in a circular recess 19 provided to receive it.

Slidably mounted on the shaft 13 there is arranged a sleeve 20, which sleeve is formed at its inner extremity with an enlarged neck 21 and a collar 22. On this enlarged neck 21 there is received a main friction disk 23, which is of slightly conical or dished form as shown, and provided near its outer edge with an annular friction face 24. In the periphery of the wheel 15 grooves or recesses 25 are formed which extend longitudinally with respect to the axis of the shaft 13 and lie opposite to the aforesaid grooves or slots 7.

I provide a plurality of friction rings 26 which I shall call inner rings, and these rings are similar to the rings 8 aforesaid, except that they are provided on their inner edges with ears 27, which ears are respectively received in the aforesaid grooves or slots 25. The grooves 25 are of substantially rectangular form and, like the grooves 7, present ball chambers in which balls 28 are placed on either side of the ears. These balls 28 are retained in the slots at the inner end thereof, by a lip 29 which projects up from the body of the wheel 15 as shown. The opposite ends of the slots are closed by small blocks 30 which are set in position as indicated. In this way the balls are maintained in position.

On the inner face of the disk 3 an annular friction face 31 is formed which lies opposite to the friction face 24 aforesaid, and the space between the faces 24 and 31 is filled by the friction rings 8 and 26. The rings are arranged in an alternating or staggered relation, as shown, so that the rings carried by the inner wheel project into the spaces between the rings carried by the outer wheel, all of the rings being adapted to be pressed together by the main friction disk 23. The clutch is provided with a cover 32, which is of slightly conical form as shown, and through which the sleeve 20 is slidably mounted as indicated. At its outer edge the cover 32 is attached to the rim 4, in any suitable manner. Around the hub of the main friction disk 23, and in the space between it and the cover 32, I provide a helical spring 33 which I shall call a main spring, and this spring, by thrusting against the cover 32, normally tends to hold the friction rings pressed against each other and against the friction face 31, exerting its full force upon these parts.

At the outer extremity of the sleeve 20, adjusting collars 34 are provided, which are adapted to receive thrust in a right hand direction from a ball ring 35, which ball ring is mounted on balls on the body of the sleeve. This ball ring is adapted to be forced over against the collars 34 by an auxiliary lever 36, the same being provided with a fork 37 at its lower extremity, the ends of which are formed into rounded heads 38 which engage the side of the ring 35 as indicated. This auxiliary lever 36 has its fulcrum at 39 on the transverse bar of a quadrant 40. Near this auxiliary lever a main lever 41 is attached, the same having its fulcrum at the point 42 and lying substantially parallel with the auxiliary lever. At the upper end of the lever 36, a lug 43 is provided, which projects toward the lever 41, and a similar lug 44 is provided on the lever 41. These lugs are adapted to contact with each other in a manner which will be described more fully hereinafter. The lower extremity of the main lever 41 is provided with an opening 45 through which passes freely a stem 46, which stem is pivotally mounted at 47 upon the auxiliary lever 36. Between the levers 36 and 41 the stem 46 is provided with threads upon which adjusting jam nuts 48 are mounted, as shown. The outer extremity of the stem 46 is provided with a movable collar 49, against which thrusts a spring 50 which is disposed about the stem, as indicated, the inner extremity of the spring resting against the side of the lever 41. Beyond the collar 49 nuts 51 are provided, which are adapted to adjust the tension of the spring. On the arc of the quadrant 40 I provide a plurality of notches 52. These notches are indicated respectively by the letters a, b, c, d; the letter a representing the notch at the left while the letter d represents the notch at the right. On the lever a lock bolt 53 is provided, which may engage any one of the notches. These notches are provided on their right hand sides with abrupt faces, and on their left hand sides with inclined faces, so that the lever may be swung toward the left without withdrawing the bolt, but only toward the right by withdrawing the bolt.

The mode of operation of the clutch will now be described: When the bolt 53 is occupying the notch a, the lugs 44 and 43 are in contact with each other, so that for all intents and purposes, the lever 36 operates as a rigid extension of the lever 41; that is, there is a positive connection between the two levers. This position corresponds to the "off" position of the clutch; that is, the sleeve 20 will be disposed as far to the right as possible. When in this position, the main friction disk 23 carried by the sleeve, is held substantially out of contact with the friction rings, the spring 33 being compressed. When the bolt 53 occupies the notch b, as illustrated in Fig. 1, the lugs 43 and 44 are out of contact, but the spring 50 is somewhat compressed. The force of this spring is exerted upon the stem 46, from which it is transmitted to the auxiliary lever 36 and the sleeve 20. This force will be sufficient to overcome a part of the expansive force being exerted by the spring 33, so that the pressure exerted by the friction disk 23 upon the rings may be said to be a differential pressure; that is, a pressure resulting from the difference in tension of the two springs. It should be understood that the spring 50 is under considerable tension in this position, so that the force subtracted from the main spring 33 is quite large; hence, it will be seen that the effective pressing force developed by the spring 33 with this position of the lever, is quite small. This position of the lever, therefore, corresponds to the minimum transmitting power of the clutch. When the lever 41 is at the notch c, a large part of the tension of the spring 50 is relieved, so that a small force is subtracted from the force exerted by the main spring 33; hence, this position of the lever corresponds to an increased transmitting power for the clutch. When the lever is moved over to the notch d, the tension of the spring 50 is completely removed, and the entire force of the main spring 33 exerts itself upon the friction clutch. This corresponds, of course, to the maximum transmitting power of the clutch. From this arrangement it will be understood that the clutch is capable of transmitting a maximum power a minimum and an intermediate power. The fact that the areas of the friction rings and their coefficient is known, enables the clutch to be accurately designed so as to transmit any required power at the different lever positions. In this way the clutch can be admirably designed so as to meet the requirements of the engine with which it is to operate; the minimum transmitting power of the clutch being not so great as to materially reduce the speed of the engine, when the latter is running on the governor, and the clutch is thrown in. Likewise, the maximum transmitting power of the clutch will be suited to the power of the engine. In this connection, the selection of the grade of springs becomes important. The balls 10 and 25 which are disposed on the sides of the ears 9 and 27, prevent any possibility that the friction rings will tend to stick when given the slight inward movement necessary to develop the pressure between their surfaces. Of course, as the friction rings or disks wear away, suitable adjustments will be made so as to allow for the same.

Having thus described my invention, I claim as new and desire to secure by Letters Patent:

1. In combination, a clutch, an auxiliary lever, means normally tending to close said clutch, a main lever, a spring opposing said means, disposed between said main lever and said auxiliary lever, and through which said main lever normally operates said auxiliary lever, means for opening said clutch by a movement of said auxiliary lever, said levers having means for engaging directly upon an extreme movement, whereby said main lever may operate said auxiliary lever independently of said spring.

2. In a clutch, in combination, friction wheels, a spring adapted to maintain a pressure between said wheels, an auxiliary lever adapted to relieve said wheels from the pressure of said first spring, a main lever and mechanism including a spring connecting the same with said auxiliary lever and through which the movement of said lever is imparted to said auxiliary lever.

3. In a clutch, in combination, friction wheels, a spring adapted to maintain a pressure between said wheels, an auxiliary lever adapted to relieve said wheels from the pressure of said first spring, a main lever and mechanism including a spring connecting the same with said auxiliary lever and through which the movement of said lever is imparted to said auxiliary lever, and means whereby said main lever may actuate said auxiliary lever independently of said spring.

4. In a clutch, in combination, a spring tending to hold the clutch closed, an auxiliary lever adapted to open the clutch, a main lever, a spring connecting said main lever and said auxiliary lever and through which said main lever may actuate said auxiliary lever, said main lever being adapted to engage directly with said auxiliary lever by an extreme movement thereof whereby said main lever may throw open said clutch independently of said second spring.

5. In a clutch, in combination, a spring tending to maintain the clutch closed, an auxiliary lever affording means for opening the clutch, a main lever, a stem carried by said auxiliary lever, a spring about said stem and thrusting against said main lever, said levers having lugs projecting toward each other and adapted to engage with an extreme movement of said main lever, whereby said main lever may become connected to open said clutch independently of said second spring.

In testimony whereof I have signed my name to this specification in the presence of two subscribing witnesses.

THOMAS W. SHEPPARD.

Witnesses:
F. D. AMMEN,
JNO. M. RITTER.